(12) United States Patent
Chatte et al.

(10) Patent No.: US 8,027,934 B2
(45) Date of Patent: Sep. 27, 2011

(54) METHOD AND SYSTEM FOR PAYING FOR A SERVICE

(75) Inventors: Fabien Chatte, Nogent sur Marne (FR); Dennis T. Gilham, Essex (GB)

(73) Assignee: NEOPOST Technologies, Bagneaux (FR)

( * ) Notice: Subject to any disclaimer, the term of this patent is extended or adjusted under 35 U.S.C. 154(b) by 601 days.

(21) Appl. No.: 11/668,788

(22) Filed: Jan. 30, 2007

(65) Prior Publication Data
US 2007/0203859 A1 Aug. 30, 2007

(30) Foreign Application Priority Data
Jan. 31, 2006 (FR) ...................................... 06 50337

(51) Int. Cl.
*G06F 17/00* (2006.01)
(52) U.S. Cl. ........................................................ 705/401
(58) Field of Classification Search .................... 705/26, 705/401
See application file for complete search history.

(56) References Cited

U.S. PATENT DOCUMENTS

| | | | | |
|---|---|---|---|---|
| 6,010,156 A | * | 1/2000 | Block ................................ 281/2 |
| 6,061,670 A | * | 5/2000 | Brand ............................ 705/404 |
| 6,064,992 A | * | 5/2000 | Herring .......................... 705/403 |
| 6,125,357 A | * | 9/2000 | Pintsov .......................... 705/408 |
| 6,296,404 B1 | * | 10/2001 | Pierce et al. ..................... 400/62 |
| 6,461,063 B1 | * | 10/2002 | Miller et al. ..................... 400/76 |
| 6,865,558 B1 | * | 3/2005 | Pierce et al. ..................... 705/60 |
| 6,922,678 B2 | * | 7/2005 | Gravell et al. ................. 705/401 |
| 2003/0208411 A1 | * | 11/2003 | Estes et al. ....................... 705/26 |
| 2004/0103067 A1 | * | 5/2004 | Mattern et al. ................. 705/401 |
| 2006/0190418 A1 | * | 8/2006 | Huberty et al. ............... 705/402 |

FOREIGN PATENT DOCUMENTS

| | | |
|---|---|---|
| DE | 100 37 631 A1 | 2/2002 |
| EP | 1 457 929 A2 | 9/2004 |
| FR | 2 847 701 A1 | 5/2004 |
| WO | WO 02/29679 A1 | 4/2002 |

OTHER PUBLICATIONS

"Postal P-to-P Service Holds Buyer's Cash Until Delivery", American Banker, v166, n173, p. 1, Sep. 7, 2001.*

* cited by examiner

*Primary Examiner* — Rutao Wu
(74) *Attorney, Agent, or Firm* — Sughrue Mion, PLLC

(57) ABSTRACT

A system of paying for a service that is delivered to a user by a provider of said service, the system including print means for printing out a docket issued by the service provider and bearing the amount to be paid for the requested service, and franking means for printing a postage amount equal to said amount to be paid on said docket or on a label affixed next to said docket.

9 Claims, 2 Drawing Sheets

METHOD AND SYSTEM FOR PAYING FOR A SERVICE

TECHNICAL FIELD

The present invention relates to the general field of paying for services and it relates more particularly to a method of paying for a service by using franking means instead of making conventional payments in cash or by card.

STATE OF THE ART

Nowadays, when it is desired to pay for a service obtained, in particular, via the Internet, it is necessary to have an account with the service provider or to be capable of paying immediately for the service by bank transfer or by credit card. That applies, for example, when it is desired to send a parcel with a private carrier such as DHL® or UPS®, for example. Unfortunately, in a firm, when said firm does not have an account with the provider of the desired service, obtaining a transfer authorization or a debit by credit card must generally be requested from the accounts department of the firm. However, it can easily be understood that, if such a solution is possible, it can only be exceptional because the accounts department cannot be continuously at the disposal of the staff for satisfying their requests as regards paying for services.

There exists therefore a need that is currently unsatisfied for an alternative payment method that avoids the above-mentioned drawbacks.

DISCLOSURE OF THE INVENTION

The present invention thus provides a novel method of paying for a service that is delivered to a user by a provider of said service, wherein payment for the service is performed by printing a postal imprint bearing a postage amount that is equal to the amount to be paid next to or on a docket issued by the service provider and bearing said amount to be paid for the requested service.

Thus, this simple way of paying by using franking means avoids the above-described drawbacks of payment by card or by transfer.

The docket may be a first label printed out by the user and affixed to the article that is the subject of the requested service, or a travel ticket or evidence of a booking for an article or a service.

The postal imprint may be printed by a postage meter on a second label which is then affixed to said article next to said first label, or directly onto said docket or onto a second label which is then affixed to said docket.

The present invention also provides a system for paying for a service that is delivered to a user by a provider of said service, the system including print means for printing out a docket issued by the service provider and bearing the amount to be paid for the requested service, and franking means for printing a postage amount equal to said amount to be paid on said docket or on a label affixed next to said docket.

Advantageously, said print means comprise a standard printer of a workstation of the user and said franking means comprise a postage meter.

Preferably, said postage meter is connected to a computer server of the meter franchise, which server is itself connected to a computer server of the service provider.

In an advantageous embodiment, the workstation of the user is connected via a data link to the postage meter.

BRIEF DESCRIPTION OF THE DRAWINGS

Other characteristics and advantages of the present invention appear more clearly from the following description given by way of non-limiting indication, and with reference to the accompanying drawings, in which.

IMPLEMENTATION(S) AND EMBODIMENT(S) OF THE INVENTION

In the context of paying for a service obtained in particular via the Internet, the principle of the invention is based on replacing the current payment means (card or transfer) with payment by means of a mail franking system that is at the disposal of the user of the requested service. As is known, such a system is designed to print a postal imprint which bears a postage amount that has a monetary value and that serves as evidence of payment of the postage amount or "franking" for the postal service that is to act as the carrier of the mail bearing the postal imprint. With the invention, it is proposed to use this evidence of payment as proof of payment for any service with a service provider other than the conventional postal administration.

Figure 1:
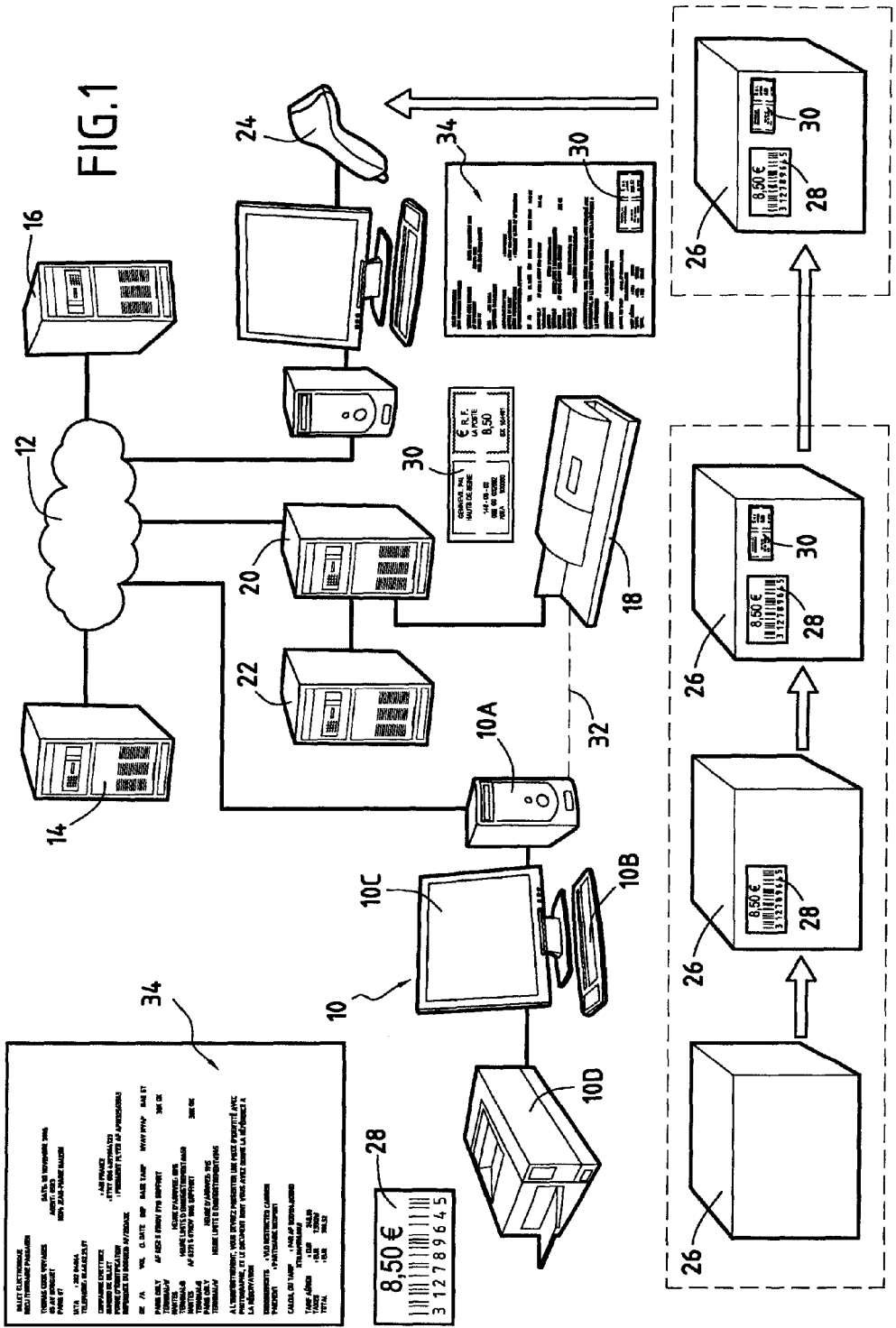
FIG. 1 shows an example of network architecture that makes it possible to implement the method of the invention for paying for services.

FIG. 1 shows the network architecture necessary for implementing the invention.

At the sender end, it is organized around a conventional user workstation 10 that can optionally be part of a local area network internal to the firm to which the user workstation belongs, and that conventionally comprises a central processing unit 10A, a user interface (keyboard 10B and screen 10C), and a standard printer 10D, from which workstation the user can access the requested service, e.g. a parcel shipping service by a private carrier such as DHL® or UPS®, a service for booking travel tickets, or a service for collecting or withdrawing any article from the holder of said article. For such access, the user workstation 10 is connected, via a communications network which is typically the Internet 12, to a computer server 14 (provider No. 1), 16 (provider No. 2) of the provider of the requested service.

The network architecture also includes a mail franking system 18 connected, as is known, to a computer server 20 of the franking franchise, which computer server is itself connected to a computer server 22 of the postal administration. The computer server of the franchise is also connected to the service provider server via the communications network 12.

The mail franking system is typically a standard franking machine or postage meter having a user interface. It thus has at least one screen that can then be touch-sensitive or more conventionally be a Liquid Crystal Display (LCD), associated with a keypad with function keys. The user interface generally makes it possible to view and to input various items of information relating to the desired franking service (machine or meter identity number, amount of the franking transaction (postage amount), class of mail, country of destination, desired logo, etc.) displayed by the machine or meter or input by the user. However, in the context of the invention, and as explained in more detail below, only the function of inputting a postage amount is used at said franking machine or postage meter.

Finally, at the destination of the parcel or of the booking, this data management computer network includes a read and identify device 24 incorporating, in particular, a scanner for enabling the service provider to verify that payment has been made. This device is connected via the communications network 12 to the computer server of the service provider.

Figure 2:
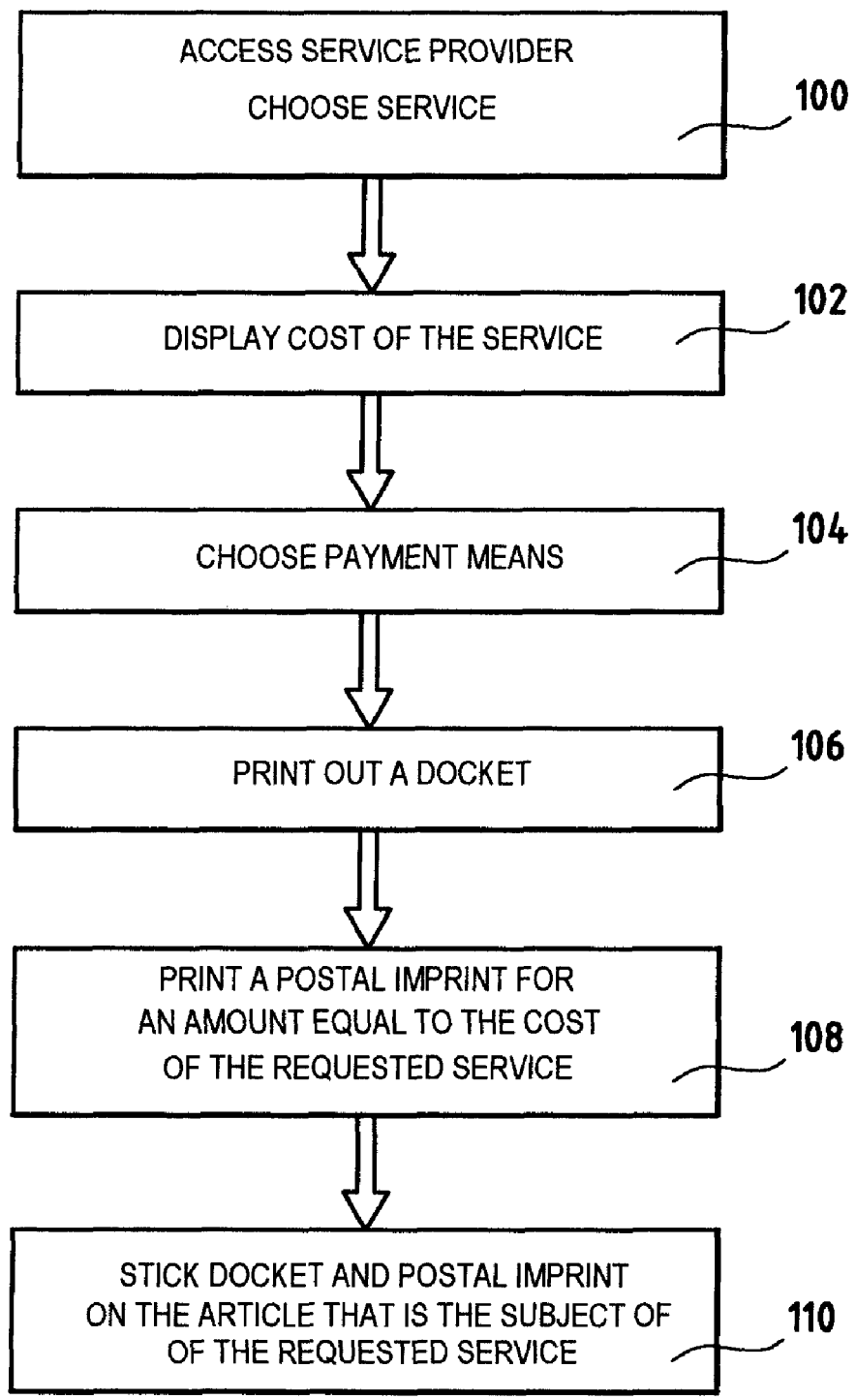
FIG. 2 is a flow chart showing the various steps of the method of the invention.

FIG. 2 is a flow chart showing the various steps making it possible, in accordance with the invention, to pay for any service by means of a mail franking machine (see also FIG. 1).

A user who, in a firm or in an administration, wishes, for example, to send a parcel 26 to a country not served by the usual carrier (i.e. the carrier with whom the firm has an account), searches, from the workstation 10, by means a conventional Internet search tool, for another carrier who does serve the desired destination. Once that carrier has been found, the user, in a first step 100, accesses the homepage of the shipping service of said other carrier, and, by following the displayed instructions, said user inputs all of the data necessary for sending the parcel, such as country of destination, weight of the parcel, insured value, etc., and the sender's own address and details. The input data corresponds to a cost of the shipping service, which cost is then displayed on the user's screen in a step 102. If the user accepts the cost, it is then proposed to the user in a step 104 to pay for the amount using the payment means chosen by the user. In this example, since the user is not a customer of the new carrier, it is proposed to said user to choose between payment by credit card, by transfer, or by partner payment, with partner payment being selected by the user so that, in accordance with the invention, the user can make a payment by means of a postage meter. A unique barcode that is preferably two-dimensional is then displayed on the user's screen accompanied by the amount to be paid for the requested service so that the user can, in a step 106, print out on nearby print means 10D a first label 28 bearing these two items of information. As is known, the presence of a barcode on the parcel serves to enable said parcel to be tracked and recognized while it is being shipped from the sender to the destination. The label printed in this way is then stuck by the user to the parcel to be sent.

The parcel labeled in this way is handed over by the user to the firm's mail department or person in charge of shipping. After becoming acquainted with the amount to be paid borne on the label 28, said person or department uses a postage meter in their possession to print on a second label 30 a postal imprint for a postage amount equivalent to said amount to be paid. Then, in a step 110, the second label bearing the postal imprint is also stuck on the parcel to be sent, next to the first label 28. The sending process is complete and the parcel can be handed over to a one of the carrier's offices or made available to be picked up by the carrier.

The carrier checks that the user has paid by performing checking at two levels. The first level is merely visual, and consists in the carrier making sure that the postal imprint is present and that the postage amount printed on the second label corresponds to the amount to be paid as borne by the first label. If the two amounts are identical, it is then assumed that the payment has been made and the parcel can thus be delivered. The second level of checking is more complex and consists in the carrier making sure that the postal imprint is valid. For this purpose, the carrier has various elements that have been supplied to it by the postal administration under a partner contract with the franking franchise, e.g. cryptographic keys enabling it to decrypt the authentication codes borne by the postal imprint or to verify the signatures that served to generate them.

The carrier is paid daily or with a periodicity that is determined with the franking meter franchise or with the postal administration. As is known, the franchise or the postal administration receives periodically from the postage meters to which it is connected itemized accounting statements of the franking operations that said postage meters have performed over a given period. In the context of the invention, provision is also made for it to be possible for the franchise or the postal administration to receive, from those partner service providers who accept payment by means of its postage meters, a statement of the operations performed by said service providers, so that it becomes possible for the franchise or the postal administration to match up the two accounting statements and thus to enable each service provider to be paid by associating a postage amount read off a determined postage meter with an identical postage amount communicated by a partner service provider.

It is also possible and indeed preferable for the service provider to be paid before any performance of the service. For this purpose, provision is made for the workstation of the user to be connected to the postage meter directly by a data link 32 if only one workstation is present, or over a local area network (not shown) if more than one workstation is present. It is thus possible to transfer data automatically between the two entities and thus to inform the postage meter not only of the amount to be paid which then does not need to be input on the keypad of said postage meter, but also of the reference of the provider of the service requested by the user. Once the franking has been performed, said reference with the corresponding postage amount can be forwarded immediately (or at the end of the day) to the server of the franking franchise which can in turn inform the service provider and optionally pay immediately for the service which is to be delivered to the user.

This procedure is particularly advantageous when booking a ticket, e.g. for travel by air, train, or ferry. By accessing the Internet site of the carrier, the user can print out an electronic ticket 34 bearing the amount to be paid for the travel service, and then put the ticket through the postage meter for the purpose of printing the postage imprint 30 on it (or of printing the postal imprint on a label that is then stuck to the previously printed-out ticket). On boarding, an employee of the carrier (or of the service provider) can check visually, by the presence of the postal imprint on the electronic ticket that said ticket has been paid for, and, after comparing the data of the imprint (after scanning it) with the data present in the server of the service provider, that the payment has indeed reached it and thus authorize boarding. Otherwise it can be assumed that fraud has been committed and boarding is refused.

What is claimed is:

1. A method of paying for a non-postal service that is delivered to a user by a provider of said non-postal service, the method comprising:
   communicating by the user with the provider to determine an amount for the requested service;
   issuance by the provider to the user of a docket bearing a human-readable docket amount that is equal to said amount to be paid; and
   printing by the user using a franking machine a postal imprint, bearing a human-readable postage amount that is equal to said amount to be paid, next to or on the docket issued by the non-postal service provider.

2. A method according to claim 1, further comprising the step of printing out said docket by the user on a first label and affixing the first label to the article that is the subject of the requested non-postal service.

3. A method according to claim 2, further comprising the step of printing out said postal imprint by a postage meter on a second label and affixing the second label to said article next to said first label.

4. A method according to claim 2, wherein said docket is a travel ticket or evidence of a booking for an article or a non-postal service.

5. A method according to claim 4, further comprising the step of printing out said postal imprint by a postage meter directly onto said docket or onto a second label which is then affixed to said docket.

6. A method according to claim 1, wherein printing the postal imprint next to or on the docket is performed by the user.

7. A method according to claim 6, further comprising verifying that payment has been made, verifying being performed by the non-postal service provider.

8. A method according to claim 7, wherein verification that payment has been made is performed by scanning the postal imprint.

9. A method according to claim 7, wherein verification that payment has been made is performed by visually inspecting the postal imprint and the docket, and comparing the postage amount on the postal imprint with the amount to be paid on the docket.

* * * * *